US006356665B1

United States Patent
Lei et al.

(10) Patent No.: US 6,356,665 B1
(45) Date of Patent: Mar. 12, 2002

(54) QUAD-TREE EMBEDDED IMAGE COMPRESSION AND DECOMPRESSION METHOD AND APPARATUS

(75) Inventors: Shaw-Min Lei, Camas; Jin Li, Vancouver, both of WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/209,318

(22) Filed: Dec. 9, 1998

(51) Int. Cl.[7] .................................................. G06K 9/36
(52) U.S. Cl. ........................... 382/240; 382/226; 341/79
(58) Field of Search ................................. 382/232, 240, 382/233, 248, 226; 341/79

(56) References Cited

U.S. PATENT DOCUMENTS

| | | | |
|---|---|---|---|
| 4,261,018 A | 4/1981 | Knowlton | 358/263 |
| 4,816,914 A | 3/1989 | Ericsson | 358/133 |
| 4,849,810 A | 7/1989 | Ericsson | 358/133 |
| 4,868,653 A | 9/1989 | Golin et al. | 358/133 |
| 5,212,742 A | 5/1993 | Normile et al. | 382/232 |
| 5,218,431 A | 6/1993 | Gleicher et al. | 358/13 |
| 5,228,098 A | 7/1993 | Crinon et al. | 382/232 |
| 5,267,334 A | 11/1993 | Normille et al. | 382/232 |
| 5,412,741 A * | 5/1995 | Shapiro | 382/232 |
| 5,444,489 A | 8/1995 | Truong et al. | 348/422 |
| 5,452,104 A | 9/1995 | Lee | 358/433 |
| 5,576,767 A | 11/1996 | Lee et al. | 348/413 |
| 5,592,227 A | 1/1997 | Feng | 348/414 |
| 5,724,451 A | 3/1998 | Shin et al. | 382/240 |
| 5,748,116 A | 5/1998 | Chui et al. | 341/50 |
| 5,982,434 A * | 11/1999 | Tong et al. | 348/398 |
| 5,982,938 A * | 11/1999 | Dube | 382/240 |

FOREIGN PATENT DOCUMENTS

| | | | |
|---|---|---|---|
| EP | 0701375 A2 | 3/1996 | H04N/7/24 |
| EP | 0855838 A2 | 7/1998 | H04N/7/26 |
| WO | WO 98/52346 | 11/1998 | H04N/1/415 |

OTHER PUBLICATIONS

Peter Strobach, "Quadtree–Structured Recursive Plane Decomposition Coding of Images," *IEEE International Conference on Acoustics, Speech, and Signal Processing, Glasgow*, Scotland, May 1989, pp. 1380–1397.

Gary J. Sullivan and Richard L. Baker, "Efficient Quadtree Coding of Images and Video," *IEEE Transactions on Image Processing*, vol. 3, No. 3, May 1994, pp. 327–331.

Amir Said and William A. Pearlman, "A New, Fast, and Efficient Image Codec Based on Set Partitioning in Hierarchical Trees," *IEEE Transactions on Circuits and Systems for Video Technology*, vol. 6, No. 3, Jun. 1996, pp. 243–250.

Jerome M. Shapiro, "Embedded Image Coding Using Zerotrees of Wavelet Coefficients," *IEEE Transactions on Signal Processing*, vol. 41, No. 12, Dec. 1993, pp. 3445–3462.

* cited by examiner

*Primary Examiner*—Jose L. Couso
*Assistant Examiner*—Anh Hong Do
(74) *Attorney, Agent, or Firm*—Marger Johnson & McCollom, PC

(57) ABSTRACT

A quad-tree embedded image coding technique is used in combination with a bit-plane encoding technique to provide an efficient and low complexity embedded image coding system. A simple quad-tree method identifies coefficients as significant, insignificant, or refinement at each successive quantization level. The quad-tree technique is used instead of the zero-tree or hierarchical tree used in previous encoders.

25 Claims, 8 Drawing Sheets

QUAD-TREE EMBEDDED IMAGE COMPRESSION AND DECOMPRESSION METHOD AND APPARATUS

BACKGROUND OF THE INVENTION

This invention relates to embedded coders and more particularly to an embedded image encoder with improved compression efficiency and decreased implementation complexity.

The ability to adjust the compression ratio by simply truncating an encoded bitstream makes embedded coding attractive for a number of applications such as progressive image transmission, internet browsing, scalable image and video databases, digital cameras, low delay image communications, etc. Taking Internet image browsing as an example, embedded coding makes it feasible to store only one copy of a high quality compressed bitstream on the server.

Depending on user demand, channel bandwidth conditions, and browser monitor quality, selectable amounts of the compressed bitstream are delivered to the browser. At an early stage of browsing, images can be retrieved with coarse quality so that a user can quickly go through a large number of images before choosing one of interest. The chosen image is then fully downloaded with a much better quality level. During the download process, the image quality is incrementally refined. The user can cancel the download process as soon as the quality is satisfactory.

Shapiro describes an Embedded Zerotree Wavelet algorithm (EZW) in his paper J. M. Shapiro, "Embedded Image Coding Using Zerotrees of Wavelet Coefficients," IEEE Trans. on Signal Processing, Vol. 41, No. 12, pp. 3445–3462, December 1993. The embedded image coded bitstream can be terminated or truncated at any point. This allows the decoded image to always have a reasonable good quality with respect to the number of coded bits actually used. The zero tree symbol contains coefficients across multiple sub-bands. Therefore, in implementation, the coder has to traverse multiple subbands to establish the zero tree structure, the memory requirement of the codec is thus high. Furthermore, the cross subband zerotree symbol also makes it inefficient for spatial scalable image coding, i.e., to decode only an image of a coarser resolution.

New improvements over the EZW include the Set Partitioning in Hierarchical Trees (SPIHT) encoding algorithm described by Said and Pearlman. A. Said and W. Pearlman, "A New, Fast, and Efficient Image Codec Based on Set Partitioning in Hierarchical Trees," IEEE Trans. on Circuits and Systems for Video Technology, Vol. 6, No. 3, pp. 243–250, June 1996. SPIHT maintains and manipulates 3 lists during coding: the list of insignificant sets (LIS), the list of insignificant pixels (LIP) and the list of significant pixels (LSP). With arithmetic entropy coding, SPIHT outperforms EZW. Furthermore, one mode of SPIHT achieves good compression efficiency without using any explicit Variable Length Code (VLC) such as a Huffman code or arithmetic code. However, at high bit-rates, the list built by SPIHT becomes very large and memory consuming. Therefore, it is expensive to implement.

Chui and Yi proposed a nested split coding algorithm. C. Chui, R. Yi, "System and method for nested split coding of sparse data sets", U.S. Pat. No. 5,748,116. The nested coding encodes transform coefficients in data blocks. The algorithm is very fast and cheap to implement, but does not have the embedded functionality which is crucial in many applications.

A need remains for further improving the compression efficiency and reducing the implementation complexity of encoding techniques such as EWZ and SPIHT.

SUMMARY OF THE INVENTION

A quad-tree embedded image coding technique is used in combination with a bit-plane encoding technique to provide an efficient and low complexity embedded image coding system. A simple quad-tree method identifies transform coefficients as significant, insignificant, or refinement at each successive quantization level. The quad-tree technique is used instead of the zero-tree or hierarchical tree used in previous encoders. Since the quad-tree can be restricted within the subband, it may achieve spatial scalability in additional to the quality scalability. The coder does not maintain a list in coding, which also decrease the memory requirement for the coder.

The quad-tree embedded encoder takes as input a two-dimensional array of image coefficients, with each coefficient having values extending over multiple bit-planes. The coefficients are segmented into a certain number of root blocks. The segmentation can be just one root block covering the entire image, or it can be pre-split subbands where one subband is an initial root block, or it can be a number of pre-specified blocks covering the entire image. A block is said to be significant if and only if there is any "1" bit in the current bit-plane or in the more significant bit-plane of the block. The encoder proceeds bit-plane by bit-plane, from the most significant bit-plane to the least significant bit-plane. For each bit-plane, the encoder checks each root block for one of three cases.

In the first case the block was already significant at the previous bit-plane, the encoder then proceeds to each of its four sub-blocks (quadrants). In the second case the block just becomes significant at the current bit-plane, a "1" bit is encoded and the encoder proceeds to each quadrant of the block. In the third case the block remains insignificant, a "0" bit is encoded concluding coding of the block for the current bit-plane.

If the encoder proceeds to each quadrant, it repeats the same operations on each sub-block (quadrant). The quadrant significance information may be optionally entropy encoded by a Huffman or arithmetic coder, or may be simply directly sent into the bitstream.

Once a split quadrant reaches the size of a single coefficient, the bit of the current coefficient at the current bit-plane is encoded, and if the coefficient just becomes significant, its sign bit is encoded right after. The coding and splitting of quadrants is repeated for each progressively lesser significant bit-plane until reaching a predetermined number of encoded bits or image quality.

The foregoing and other objects, features and advantages of the invention will become more readily apparent from the following detailed description of a preferred embodiment of the invention which proceeds with reference to the accompanying drawings.

DETAILED DESCRIPTION

Quad-tree encoding techniques have been widely used as an efficient method to encode variable-size blocks resulting from regular decomposition.

Quad-tree encoding is described in G. J. Sullivan and R. L. Baker, "Efficient Quadtree Coding of Images and Video," IEEE Trans. on Image Processing, Vol. 3, No. 3, pp. 327–331, May 1994; and P. Strobach, "Quadtree-Structured Recursive Plane Decomposition Coding of Images," IEEE Trans. on Signal Processing, Vol. 39, No. 6, pp. 1380–1397, June 1991. In this invention, quad-tree and bit-plane approaches are combined to provide a low-complexity embedded image coding method.

Figure 1:
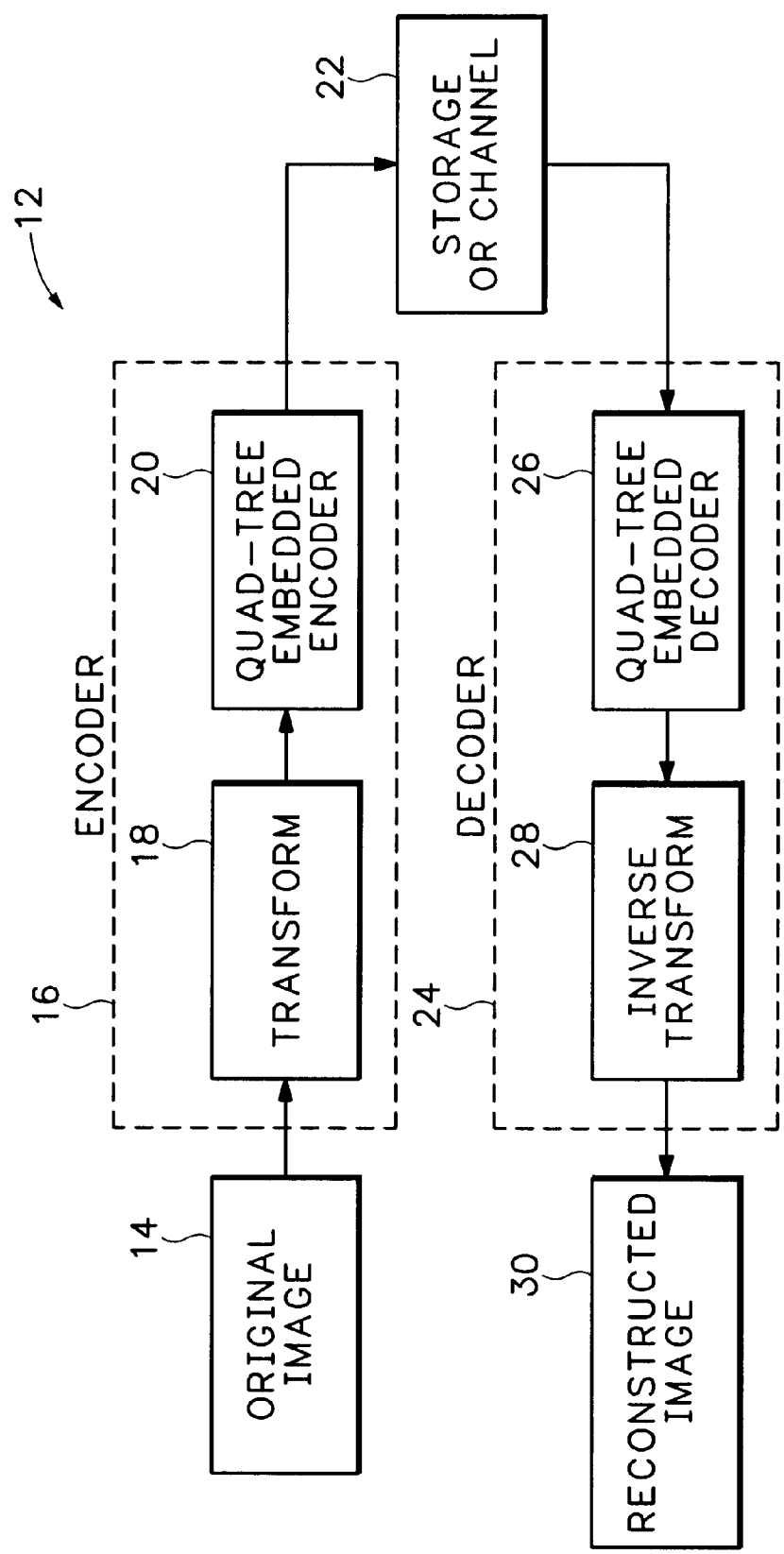
FIG. 1 is a block diagram of a quad-tree embedded encoder and decoder according to the invention.

Referring to FIG. 1, an encoder/decoder system 12 includes an encoder 16 that receives an original digitized image 14. The encoder 16 includes a transform 18 that transforms the original image 14 into transform coefficients. A quad-tree embedded encoder 20 according to the invention encodes the coefficients from transform 18. The encoded bits from the quad-tree embedded encoder 20 are either stored in a storage device or transmitted over a communication channel 22.

A decoder 24 reverses the encoding process performed in encoder 16. The decoder 24 includes a quad-tree embedded decoder 26 according to the invention that decodes the encoded data from storage or communication channel 22. An inverse transform 28 converts the decoded coefficient bitstream back into a reconstructed image 30.

The transform 18 concentrates image signal energy in a small number of transform coefficients. The quad-tree embedded encoder 20 can code these coefficients much more efficiently. The transform 18 can be any transform that has the energy compaction property. For example, the transform 18 can be a Discrete Cosine Transform (DCT) or a Wavelet Transform (WT). The wavelet transform is used for illustration purposes, but the quad-tree embedded encoder is just as easily applied to DCT coefficients. The quad-tree embedded coder does not have to be used in combination with a transform 18. For example, the quadtree embedded coder might be used directly on image or text data. Additional encoding can be performed in combination with the quad-tree embedded encoder 20 to further compress the image bitstream. For example, an Huffman or arithmetic encoding scheme can be incorporated with the quad-tree embedded encoder 20. The quad-tree embedded coding is based on two major principles: 1) bit-plane approach and 2) quad-tree representation (or coding).

Bit-Plane Approach

Figure 2:
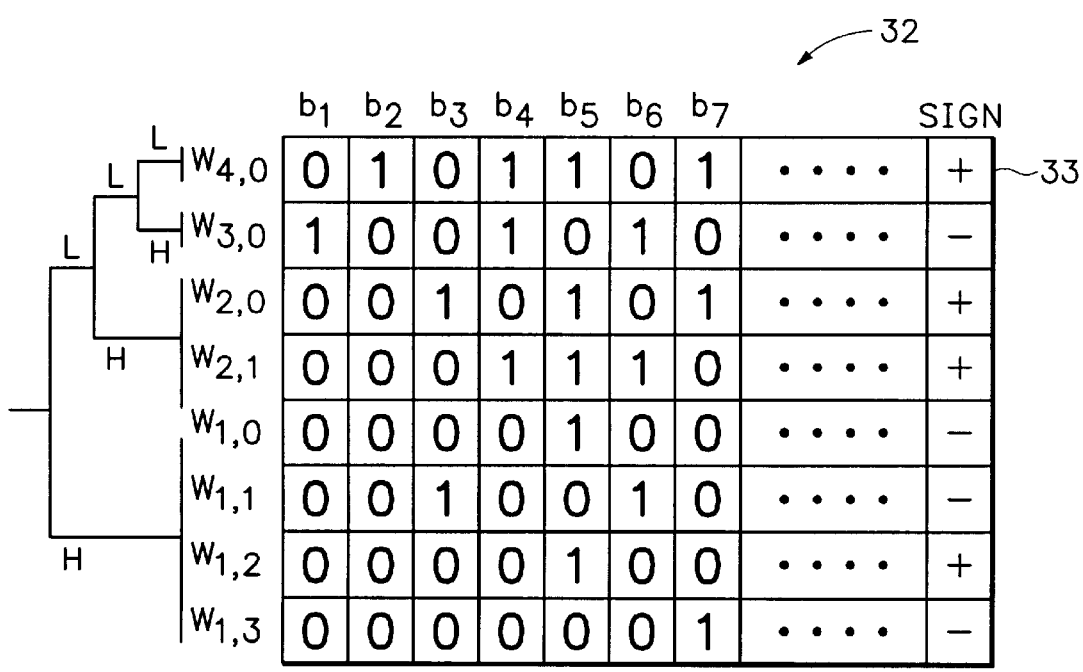
FIG. 2 is a table of transform coefficients and associated bit-planes.

Traditionally, quantization determines how many bits of each transform coefficient are going to be encoded. A lossless entropy coding technique then encodes the quantized coefficients. FIG. 2 shows an example with ID wavelet transform coefficients 32. Each row 33 is the sign-magnitude binary representation for one of the transform coefficients 32. The most significant bit of each coefficient, $b_1$, is on the left. Traditional encoding approaches decide how many bits of coefficients 32 need coding. As an example, if a 5 bit coding precision is required, bits $b_1$ to $b_5$ of coefficients 32 will be coded row by row.

The bit-plane approach usually does not have an explicit quantization step. Starting from the most significant bit, the most significant bit-plane is encoded, then the next significant bit-plane, and so on. Bit-planes are encoded until a pre-specified number of coded bits or a desired image quality is reached. Using FIG. 2 as an example, the bit-plane approach encodes bits in a column by column manner by first encoding the bits in the $b_1$ bit-plane, then the bits in the $b_2$ bit-plane, and so on.

An advantage of this coding approach is the embedded property. The most significant part of each coefficient is encoded first. This allows arbitrary termination of the encoding or truncation of the bitstream and subsequent reconstruction of an image with reasonable image quality.

Quad-Tree Coding

Quad-tree coding efficiently represents two-dimensional variable-size regions. An image region is formed in such a way that the elements in the region have some common properties. A region can be formed either in a bottom-up fashion that recursively merges common neighbors, or in a top-down fashion that recursively decomposes regions with very different sub-regions. Quad-tree representation provides a simple (low overhead) but fixed somewhat constrained structure to describe the final variable-size regions. It is closely related to a hierarchical data structure and the principles of recursive decomposition, which are similar to divide and conquer methods.

Figure 3:
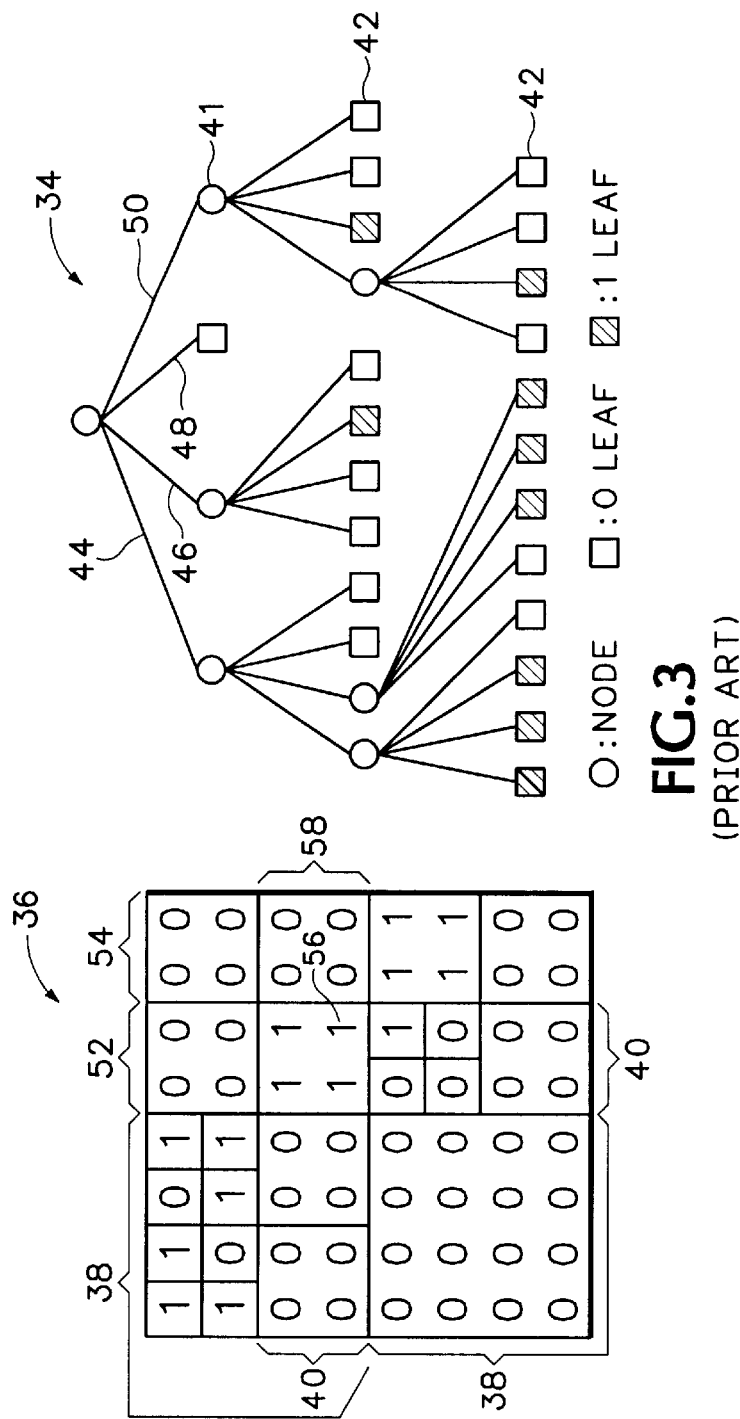
FIG. 3 is a quad-tree representation of image regions.

FIG. 3 shows a prior art quad-tree representation of regions. A block in the quad-tree representation is always split into four equal-size sub-blocks, if decomposition is needed and the decomposition can be done recursively. An 8×8 block 36 is shown on the left side of FIG. 3. The whole 8×8 block 36 is described as a root block. If the numbers in the parent root block 36 are not all the same, which is the case in this example, the root block 36 is subdivided into four 4×4 sub-blocks 38. Each sub-block 38 can be further subdivided into four smaller sub-blocks 40 if the numbers in the parent block 38 are not all the same. The decomposition is repeated recursively until there is no further decomposition needed or the smallest possible block size is reached.

The right-hand side of FIG. 3 shows a quad-tree 34 resulting from root block 36. The quad-tree 34 can be represented by a bitstream that uses "1" to represent an internal node 41 and "0" to represent a leaf 42. The scan of the quad-tree 34 can be width first or depth first, depending on the application. The scan order of the four sub-blocks split from a node can also be arbitrary.

Figure 4:
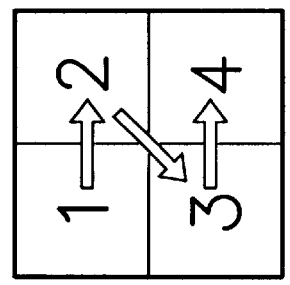
FIG. 4 is a diagram showing a Z scan for four image regions.

A common scan order is row by row from top-left to bottom-right as shown in FIG. 4. It is also called a Z scan. Descriptors describing the common properties of each leaf 42 follow right after the 0 that specifies the leaf, or they can be collectively placed after the bitstream that specifies all the branching points of the whole tree. Using FIG. 3 as an example, with a depth-first tree scan and Z sub-block scan, the bit-plane root block 36 is described as:

1111110101110000 100000100 00 110100010000

When a single-element sub-block is reached, it is not necessary to send a "0" to specify that it is a leaf since it is always the case. The first 16 bits are used to encode the first branch 44 representing the upper left quadrant of bit-plane root block 36. The next nine bits "100000100" are used to encode the second branch 46. For the nine bits representing the second branch 46, the first "1" bit indicates the upper right-hand quadrant are broken up into four subquadrants. The next bit pair "00" indicate the subquadrant 52 is all zeros. The next bit pair "00" indicates the next subquadrant 54 is all zeros. The next bit pair "01" indicates the third subquadrant 56 is all ones and the final two zeros indicate the fourth subquadrant 58 is all zeros.

Bits 26 and 27 in the bitstream are both zeros and represent the lower left quadrant as containing all zeros. Bits 28–39 represent the lower right quadrant. The quad-tree representation needs 39 bits to describe the whole root block 36, compared to 64 if the root block 36 is coded row by row. The quad-tree representation 34 can efficiently represent a two-dimensional array 36 with elements of common properties that tend to cluster together to form large regions, e.g., a sparse array.

Quad-Tree Embedded Coding

The quad-tree embedded encoder 20 (FIG. 1) more efficiently encodes an image by incorporating the principles of both the bit-plane approach and the two-dimensional quad-tree approach. After the transform, the coefficients are segmented into root blocks. The segmentation can be just one root block covering the entire image, or it can be pre-split subbands where one subband is an initial root block, or it can be a number of pre-specified size blocks covering the entire image. In general, the sizes of the root blocks can be different or the same and root blocks can be specified independently or according to transform structure (e.g., subband structure in wavelet transform). The considerations are: 1) The coefficients in a root block have as much correlation as possible; and 2) The root blocks should have reasonable size in order to achieve efficiency.

A transform coefficient is significant if and only if its absolute value is greater than or equal to the value of the currently scanned bit-plane. A block is significant if and only if at least one coefficient in the block is significant. The quad-tree embedded encoder 20 (FIG. 1) uses the quad-tree representation to encode the insignificant blocks efficiently.

The encoding is done bit-plane by bit-plane, from the most significant bit-plane to the least significant bit-plane. The most significant bit-plane value $2^M$ can be found by $2^{M+1} > C_{max} \geq 2^M$, where $C_{max}$ is the maximum absolute value of all coefficients. It is also possible to implicitly derive the maximum possible M from the original image bit depth and the extra bit precision resulting from transform operations. For example, the original image is of bit depth L, where the image values range from $-2^{L-1}$ to $2^{L-1}$, and the transform used for generating the coefficients is a wavelet transform with Haar filters. The maximum absolute value of wavelet coefficients at transform level K is $2^{L+K-1}$. M is then set as M=L+K−2 in this example. If M is determined from the maximum absolute value of all coefficients $C_{max}$, M needs to be encoded and transmitted to the decoder. However, if M is implicitly derived from the maximum possible value, it need not be transmitted.

Assume encoding of a $2^N \times 2^N$ block of coefficients. This block is the root block. Starting from bit-plane k=M, every block (or sub-block) is checked for its significance with respect to the currently scanned bit-plane value (or called threshold) $2^k$. Each block is categorized into one of the three cases: 1) an insignificant block, 2) a new significant block, or 3) an old significant block. If the block is insignificant, a "0" bit is output and no further decomposition is necessary. If it is a new significant block, a "1" bit is output. It is not necessary to specify an old significant block since its information was already available from a previous iteration.

A significant block (new or old) is always decomposed into four sub-blocks unless it is a single coefficient. If a new significant coefficient is reached, its sign bit is output right after the "1" bit which specifies its significance. If an old significant coefficient is reached which is known from prior coded information, the bit of its absolute value that corresponds to the currently scanned bit-plane, called a refinement bit, is output. After an entire bit-plane is encoded, k is reduced by one and the next bit-plane is scanned and encoded. The whole process stops upon reaching the desired number of coded bits or the desired image quality.

Figure 5:
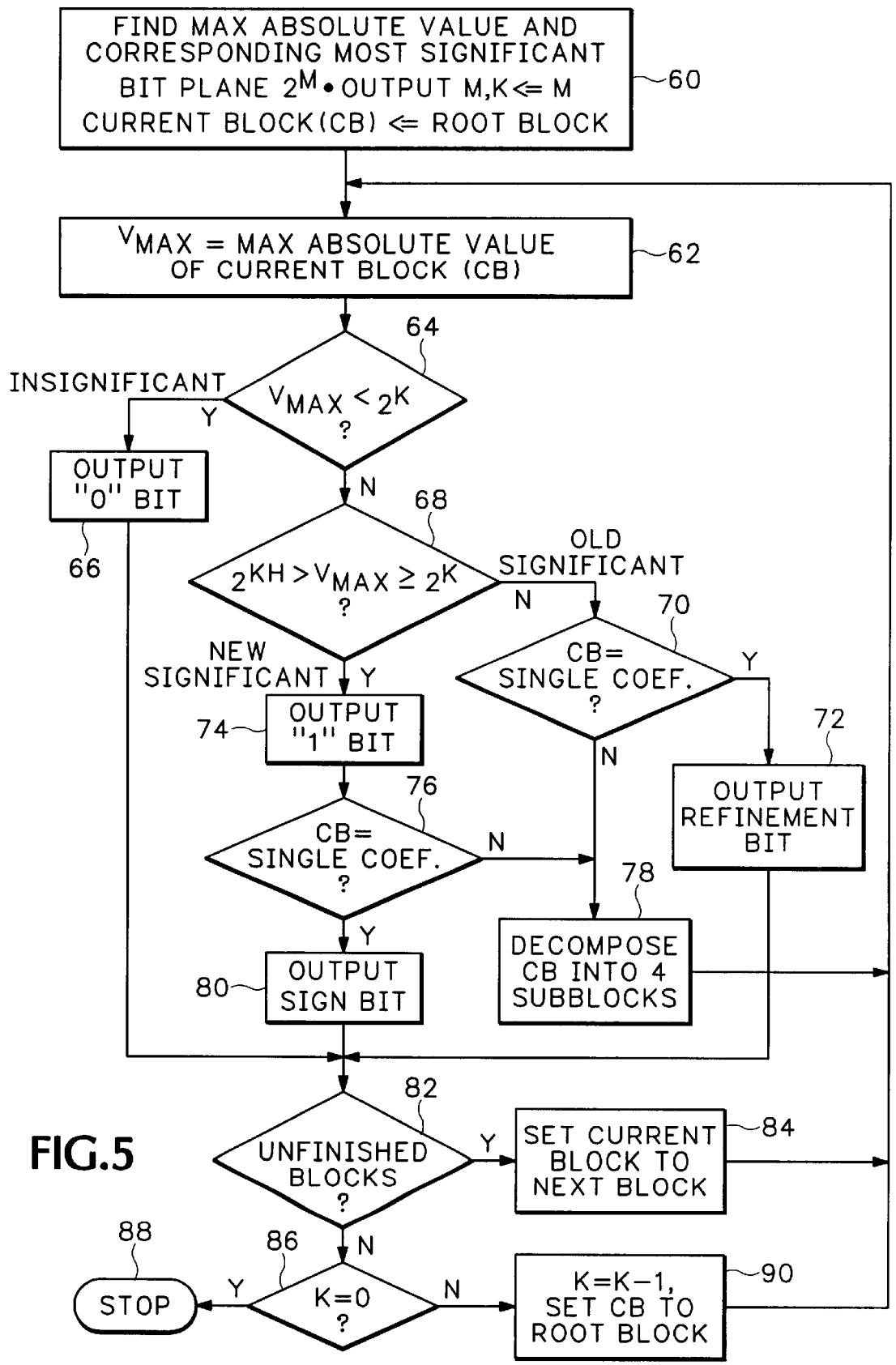
FIG. 5 is a flow diagram showing how the quad-tree embedded encoder in FIG. 1 operates.

Quad-tree embedded coding is described in further detail in FIG. 5.

Step 60: Find the maximum absolute value and the corresponding most significant bit-plane, $2^M$. If M is not implicitly derived, a code is output for M. M can be encoded by a fixed-length binary code-word with 4 or 5 bits. The value of k is set to M and the current block (CB) is set to one of the root blocks.

Step 62: The maximum absolute value of the current block is denoted as $V_{max}$. The current block is checked for its significance with respect to $2^k$:

Step 64: If the current block is insignificant, i.e., $V_{max} < 2^k$, output a "0" bit in step 66 and go to step 82.

Step 68: If the current block is a new significant block, i.e., $2^{k+1} > V_{max} \geq 2^k$, output a "1" bit in step 74.

Step 76: If the current block (CB) contains only one coefficient, output its sign bit in step 80 and go to step 82.

Step 78: Otherwise, the current block is decomposed into four sub-blocks and, for each sub-block, redefine it as the current block and go to step 62.

Step 70: If the current block is an old significant block, i.e., $V_{max} \geq 2^{k+1}$, check if it contains only one coefficient.

Step 72: If yes, output its refinement bit and go to step 82.

Step 78: Otherwise, the current block is decomposed into four sub-blocks and, for each sub-block, redefine it as the current block and go to step 62.

Step 82: If there is any unfinished blocks, set the current block to the next block in step 84 and go to step 62. Otherwise, continue to Step 86.

Step 86: If k=0, stop in step 88. Otherwise, in step 90 set k=k−1, set the current block to the root block and go to step 62.

If M is encoded, the "1" bit specifying the significance of the root block can be omitted in step 74 since the coded bits of M will provide that information.

There are different ways to determine whether a block is new significant, old significant or insignificant. For example, a register can be used to identify blocks that have become significant in a previously scanned bit-plane. The quad-tree embedded coder compares bit values in the current bit-plane blocks with associated register values. If the register values indicate a block is previously insignificant and any bit value for the block in the current bit-plane is "1", the block is new significant. The register value is then flipped to indicate the block is now significant. The coder then uses the flipped register value to identify the block as old significant in the next bit-plane.

Figure 6A:
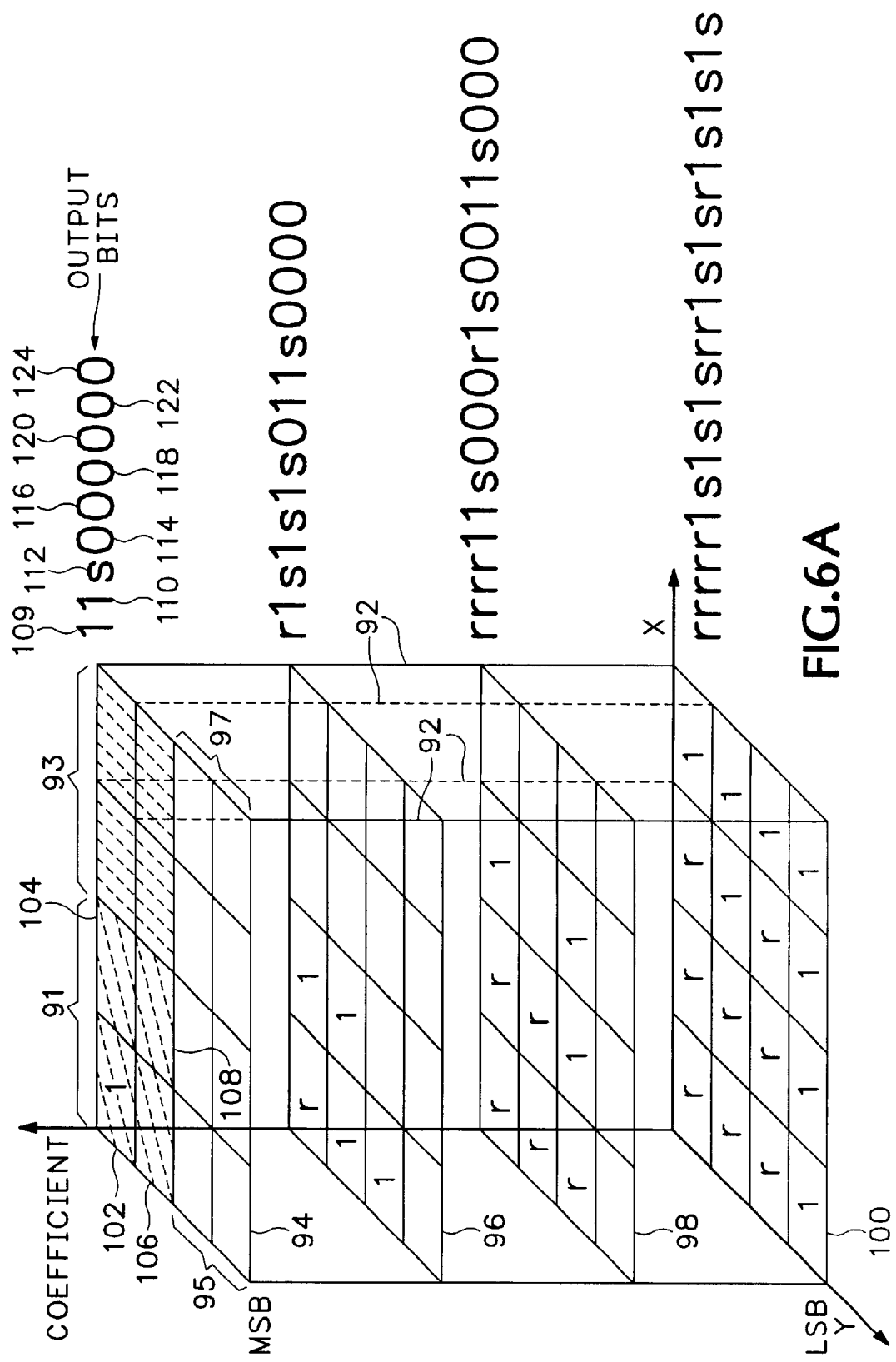
FIGS. 6a and 6b are schematic diagrams showing how the quad-tree embedded encoder operates for multiple bit-planes.
Figure 6B:
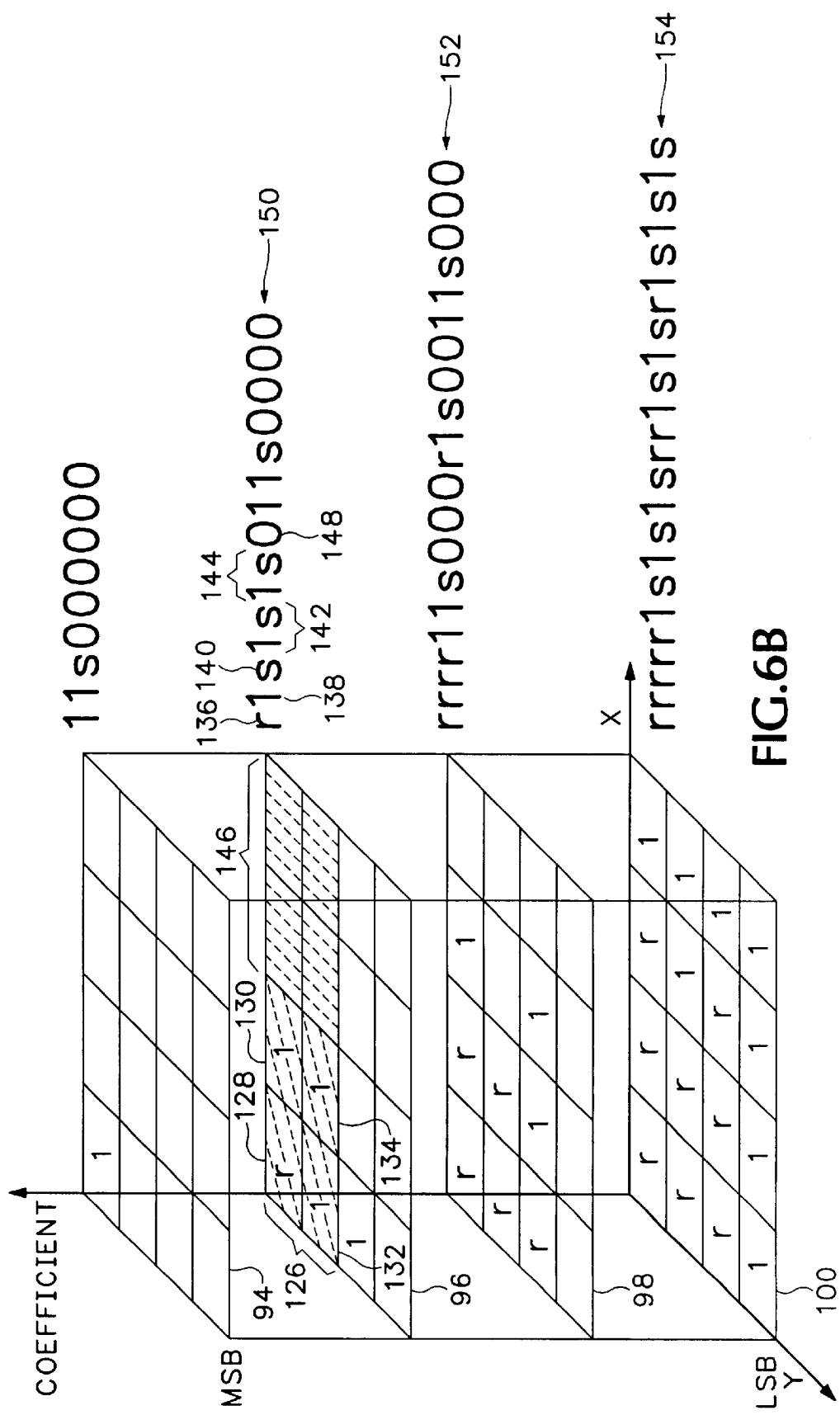

FIGS. 6A and 6B are pictorial representations of the quad-tree embedded coding scheme described in FIG. 5. Referring to FIG. 6A, a vertical column of is blocks is shown in vertical lines 92 and represents one transform coefficient. Each horizontal group of blocks 94, 96, 98 and 100 represents a bit-plane. There are four bit-planes 94, 96, 98 and 100, so the maximum absolute value for any coefficient is 15. An empty box represents a "0" bit value and a box with a "1" represents "1" a bit value.

There is a 2×2 block of bits 91 shown in dashed lines. Block 91 is the root block. The maximum absolute value in the coefficient root block 91 is determined and denoted as $C_{max}$. The value for the most significant bit-plane 94 is $2^M$ where M=3. Starting from k=M=3, every bit-plane block and then sub-block is checked, if necessary, for its significance with respect to $2^k=8$. The maximum absolute value of the current block 91 is denoted as $V_{max}=15$. The current block 91 is checked for its significance with respect to $2^k=8$. The current block 91 is defined as a new significant block, because $2^{k+1} > V_{max} \geq 2^k$ (or because there is a "1" bit in the bit-plane block 91) and a "1" bit 109 is output.

The current block 91 contains more than one coefficient so it is decomposed into four sub-blocks 102, 104, 106 and 108. Each sub-block, beginning with sub-block 102, is then redefined as the current block. The maximum absolute value of the current block 102 is $V_{max}=15$. The current block 102 is a new significant block, because $2^{k+1} > V_{max} \geq 2^k$ so a "1" bit 110 is output. Because the current block 102 only has one coefficient, its sign bit 112 is output.

Since there are unfinished blocks in bit-plane 94, the current block is set to the block 104. The maximum absolute value of block 104 is $V_{max}=7$. Since $V_{max}<2^k$, a zero 114 is output. Similarly, a "0" bit 116 is output for sub-block 106 and a "0" bit 118 is output for sub-block 108.

The next block 93 is shown shaded with dotted lines and is set to the next current block. The maximum absolute value of the current block 93 is $V_{max}=3$. The current block is insignificant because $V_{max}<2^k$ so a "0" bit 120 is output. The current block is then set to the lower left-hand block 95 in bit-plane 93. The "0" bit 122 represents the lower left-hand block 95. The "0" bit 124 represents the lower right-hand block 97 in bit-plane 93. At this point encoding for bit-plane 94 is finished. The bit-plane value is decremented k=k−1=2 and the current block is set to the next root block 126 in bit-plane 96 as shown in FIG. 6B.

Referring to FIG. 6B, the maximum absolute value of the new current block 126 is still $V_{max}=15$. The current block 126 contains more than one coefficient and is an old significant block because $V_{max} \geq 2^{k+1}$. Thus, the current block 126 is decomposed into four sub-blocks 128, 130, 132 and 134. Each sub-block is sequentially redefined as the current block, beginning with sub-block 128. The maximum absolute value of the current block 128 is $V_{max}=15$ and is defined as an old significant block because $V_{max} \geq 2^{k+1}$. However, sub-block 128 now contains only one coefficient so a refinement bit 136 is output.

The maximum absolute value of the next current block 130 is $V_{max}=7$. The current block 130 is checked for its significance with respect to $2^k=4$. The current is block 130 is a new significant block because $2^{k+1} > V_{max} > 2^k$ so a "1" bit 138 is output. The current block 130 contains only one coefficient, so a sign bit 140 is also output. The next sub-block 132 is also a new significant bit, so a "1" bit and a sign bit 142 are output. Similarly, the next sub-block 134 is encoded into a "1" bit and sign bit 144. The next current block 146 is shown shaded in dotted lines and is all "0" bits. Accordingly, a "0" bit 148 is output.

The remainder of bit-plane 96 is output in encoded bitstream 150. Similarly, the bit-plane 98 is output as encoded bitstream 152 and the bit-plane 100 is output as encoded bitstream 154.

The entire transformed image shown in FIG. 6 can be divided into a few initial blocks. Step 60 in FIG. 5 can be performed for each block and the maximum absolute value explicitly sent. Alternatively, only one maximum absolute value is sent for the entire transformed image. The value of k is set according to the maximum absolute value of the entire image in either case. The rest of the steps are performed block by block for each bit-plane. If the maximum absolute value of each block is sent, the bits specifying the significance of those blocks can be omitted.

The output bitstream of the quad-tree embedded coder may be further encoded by a Huffman or arithmetic entropy coder.

Decoding the Quad-Tree Embedded Bitstream.

Figure 7:
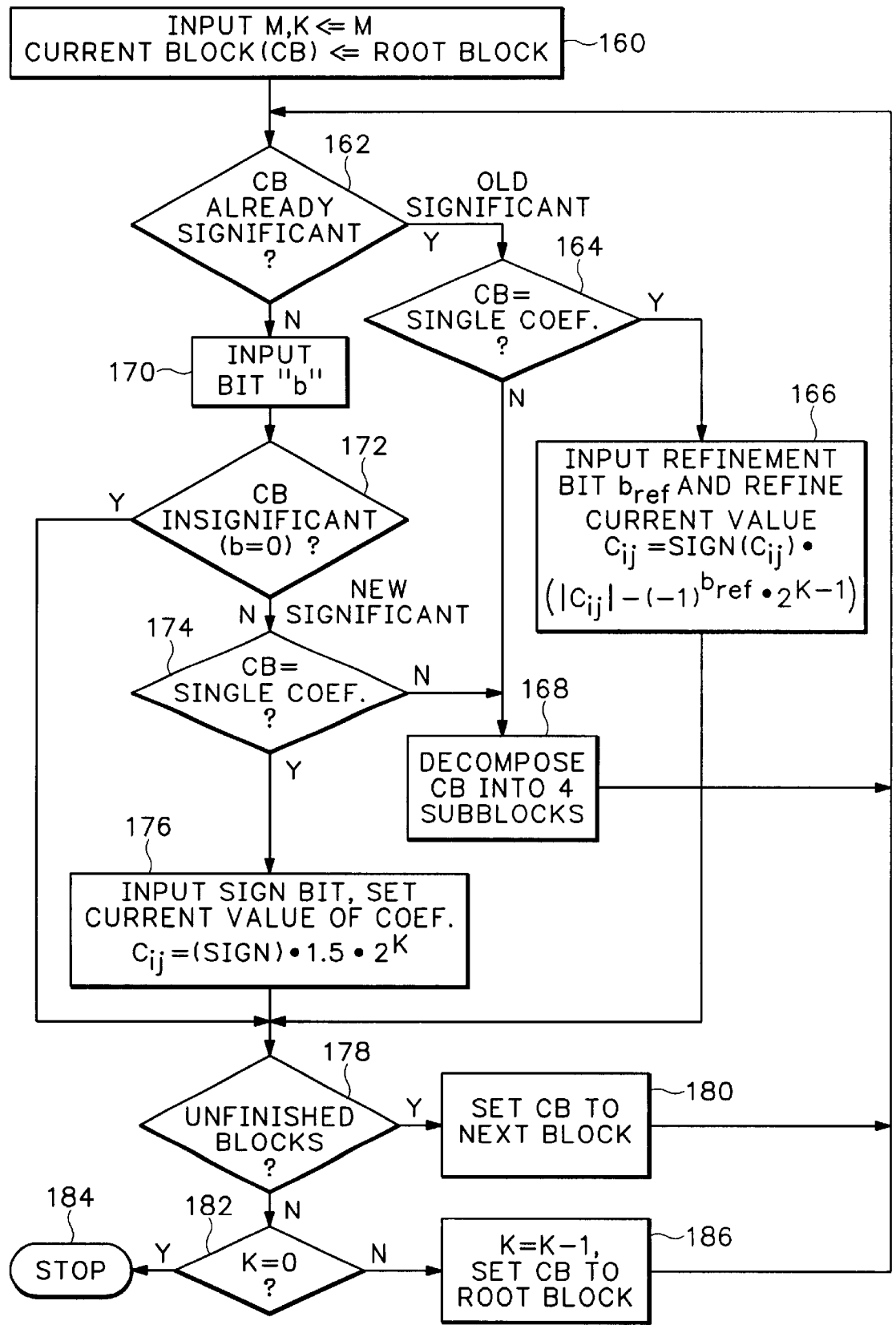
FIG. 7 is a flow diagram showing how the quad-tree embedded decoder in FIG. 1 operates.

The quad-tree embedded decoder 24 (FIG. 1) is described in FIG. 7. The decoding process is similar to the encoding procedure shown in FIG. 5.

Step 160: All the coefficients in the root block are initialized as zeros and M is decoded. The value of k is set to M and the current block is set to the root block.

Step 162: Check if the current block is already significant. If yes, go to step 164. If not, input a bit (denoted as b) in step 170.

Step 172: If b=0, the current block is insignificant. Go to step 178. If b=1, the current block is a new significant block.

Step 174: If the current block contains only one coefficient, in step 176 input its sign bit and set the current value of the coefficient (denoted as $C_{ij}$, where (i, j) is the coordinate of the coefficient) by $C_{ij}=(sign) \cdot 1.5 \ 2^k$. Then go to step 178.

Step 168: Otherwise, decompose the current block into four sub-blocks and redefine each sub-block as the current block. Go to step 162.

Step 164: The current block is an old significant block. Check if it contains only one coefficient.

Step 166: If yes, input its refinement bit (denoted as $b_{ref}$) and refine its current value by $C_{ij}=Sign(C_{ij}) \cdot (|C_{ij}|-(-1)^{b_{ref}} \cdot 2^{k-1})$.

Then go to step 178.

Step 168: Otherwise, the current block is decomposed into four sub-blocks and, for each sub-block, redefine it as the current block and go to step 162.

Step 178: If there is any unfinished blocks, set the current block to the next block in step 180 and go to step 162. Otherwise, continue to step 182.

Step 182: If k=0, stop in step 184. Otherwise, in step 186, set k=k−1, set the current block to the root block then go to step 162.

The value of each coefficient is derived so that if the encoded bitstream is truncated, each coefficient will be placed in the center of its current quantization bin.

Figure 8:
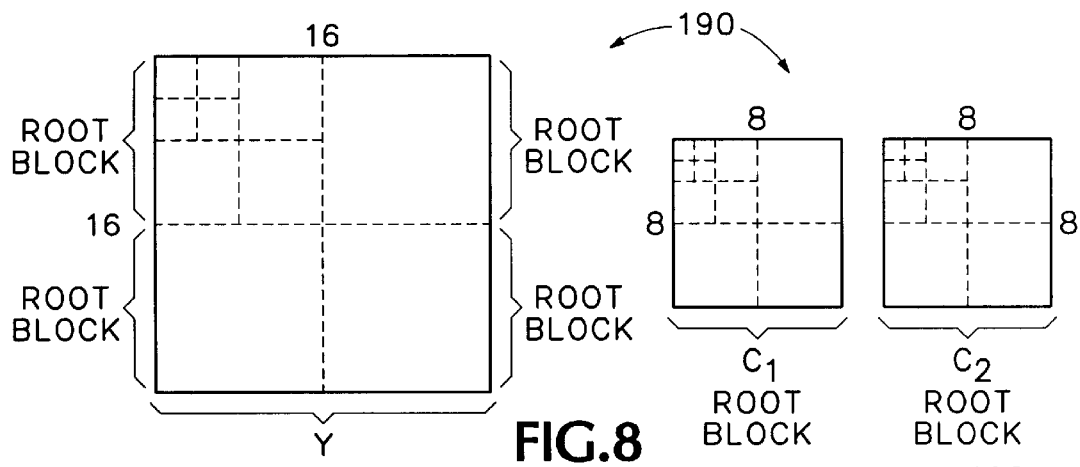
FIG. 8 is a diagram showing quad-tree embedded coding initial root blocks assigned to independent luminance and chrominance regions.

If a color image is encoded, the appropriate color transform is first applied transforming the color image into one luminance image (Y) and two chrominance images ($C_1$ and $C_2$). FIG. 8 shows an example of two chrominance images $C_1$ and $C_2$ down-sampled at a 4:1:1 ratio with respect to the luminance image Y. However, any sampling ratio can be used. The three color components of the image in FIG. 8 are (wavelet) transformed separately. The coefficients for images Y, $C_1$ and $C_2$ are divided up into separate initial root blocks. For example, the images could be initially divided into 8×8 root blocks. Four initial root blocks cover the entire 16×16 image, one root block covers the 8×8 $C_1$ image and one root block covers the 8×8 image $C_2$ However, the initial root block size can change for different subbands in the same image or can be different sizes for images Y, $C_1$ and $C_2$.

Figure 9:
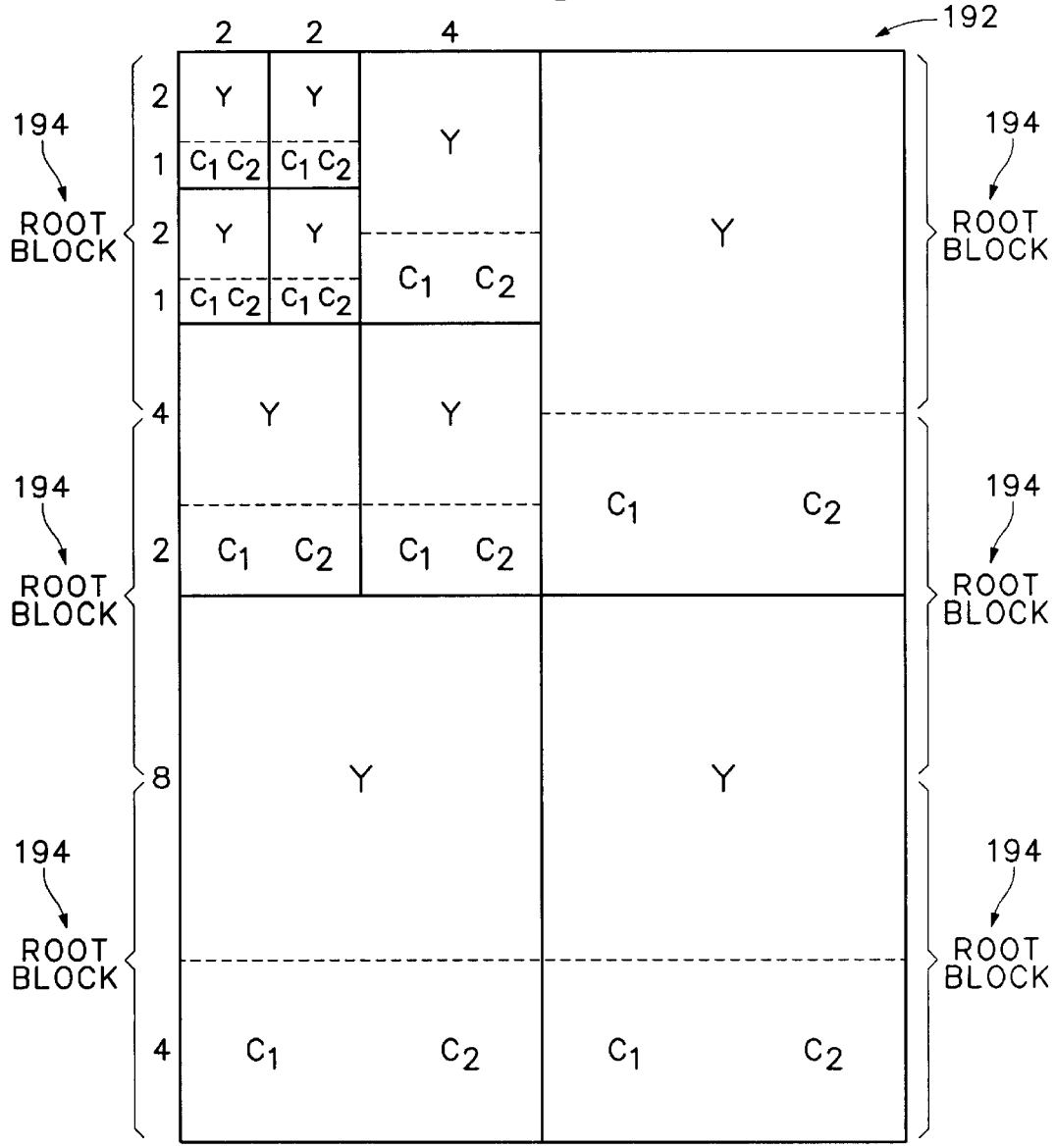
FIG. 9 is a diagram showing quad-tree embedded coding initial root blocks assigned to combined luminance and chrominance regions.

Referring to FIG. 9, a larger rectangular image is formed by tiling the three component images Y, $C_1$ and $C_2$ together. The Y, $C_1$ and $C_2$ images are transformed together so that coefficients 192 for Y, $C_1$, and $C_2$ components are placed together in the same wavelet subbands. The transform coefficients 192 are then divided into several initial root blocks. The root blocks then may include coefficients from different Y, $C_1$ and $C_2$ components. The coefficients 192 shown in FIG. 9 are divided into 8×8 initial root blocks 194. However, the size selected for the initial root blocks can be varied to cover different subband sizes or more than one subband. Encoding can be more efficient because similar components of the Y, $C_1$, and $C_2$ images are encoded together.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. An embedded coding method for a data array having values extending over multiple bit-planes, comprising:

setting up a set of initial root blocks in the data array;

in order from a most significant bit-plane to a lesser significant bit-plane, identifying the initial root blocks having one or more significant bits on a previous or a current bit-plane as significant blocks and identifying the initial root blocks having only insignificant bits on the current and the previous bit-planes as insignificant blocks;

recursively decomposing significant blocks into smaller blocks within the significant blocks in the data array until the decomposed blocks are insignificant blocks or contain a single element; and encoding the individual bit-planes by outputting a bitstream of encoded values representing insignificant blocks and decomposed blocks in order of significance starting from the most significant bit-plane to the lesser significant bit-plane.

2. A method according to claim 1 including identifying the blocks as significant when an absolute value of any one coefficient in the block is greater than or equal to a value of a currently scanned bit-plane and identifying the blocks as insignificant when the absolute value is less than the value of the currently scanned bit-plane.

3. An embedded coding method for a data array having values extending over multiple bit-planes, comprising:

setting up a set of initial root blocks in the data array;

identifying the initial root blocks having one or more significant bits as significant blocks in the bit-planes and identifying the initial root blocks having only insignificant bits as insignificant blocks in the bit-planes;

decomposing significant blocks until the decomposed blocks have only insignificant bits or contain a single coefficient; and encoding the individual bit-planes by outputting a bitstream of encoded values representing insignificant blocks and decomposed blocks, wherein the significant blocks are identified as new significant blocks when the absolute value for at least one of the coefficients is between the value of the currently scanned bit-plane and a value of a last previously scanned bit-plane and identified as old significant blocks when the absolute value is greater than the value of the last previously scanned bit-plane.

4. A method according to claim 1 wherein said encoding comprises:

outputting one bit for each of said insignificant blocks;

outputting one bit for each of said significant blocks identified as a new significant block;

outputting a sign bit for each of said new significant blocks comprising only a single coefficient; and outputting a refinement bit for each of said significant blocks identified as an old significant block comprising only a single coefficient.

5. A method according to claim 4 wherein the output bitstream is further encoded by an entropy coder.

6. A method according to claim 1 including initializing encoding by outputting a value corresponding to the most significant one of the bit-planes for all the data array values.

7. A method according to claim 1 wherein said initial root blocks initially comprise one root block covering all data array values.

8. A method according to claim 1 wherein said initial root blocks initially comprise multiple root blocks with the same size.

9. A method according to claim 1 wherein said initial root blocks initially comprise multiple root blocks of different sizes.

10. A method according to claim 1 wherein the data array is a color image and encoding the color image by transforming luminance image components and chrominance image components of the color image into coefficients and dividing the luminance coefficients and different chrominance coefficients into initial root blocks and encoding each root block.

11. A method according to claim 10 including:

transforming the luminance image components with the chrominance image components so that luminance coefficients and chrominance coefficients are located together in similar subbands; and dividing the luminance coefficients and the chrominance coefficients in similar subbands into the same initial root blocks.

12. A method according to claim 1 wherein the data array comprises transform coefficients generated by wavelet transforming an image.

13. A method according to claim 12 wherein said initial root blocks comprise one initial root block per subband.

14. A method according to claim 1 including storing bit values that identify the significance and insignificance of the blocks for previously scanned bit-planes and comparing the stored bit values with currently scanned bit-plane values to determine new significance, old significance and insignificance of blocks in the currently scanned bit-plane.

15. An embedded coding method for a data array having values extending over multiple bit-planes, comprising:

setting up a set of initial root blocks in the data array;

identifying the initial root blocks having one or more significant bits as significant blocks in the bit-planes and identifying the initial root blocks having only insignificant bits as insignificant blocks in the bit-planes;

decomposing significant blocks until the decomposed blocks have only insignificant bits or contain a single coefficient;

encoding the individual bit-planes by outputting a bitstream of encoded values representing insignificant blocks and decomposed blocks;

decoding the encoded coefficients as follows:

initializing root blocks as zeros;

decoding the maximum significant bit-plane or implicitly inferring it from the transform;

scanning root blocks from the most significant bit-plane to the least significant bit-plane;

setting a current block to one root block in a current bit-plane value;

identifying the current block as new significant, old significant or insignificant;

deriving a coefficient value for the current block according to a current bit-plane value and an encoded sign bit when an encoded input bit indicates the current block is new significant and contains only one coefficient;

inputting an encoded refinement bit and refining the coefficient value for the current block according to the current bit-plane value and the refinement bit when the current block is old significant and contains only one coefficient; and decomposing the current block into sub-blocks and sequentially redefining the sub-blocks as the current block when the current block is significant and contains more than one coefficient.

16. A method according to claim 15 wherein the new significant coefficient value is $C_{ij}=(\text{sign}) \cdot 1.5 \cdot 2^k$, sign is the encoded sign bit, and $2^k$ is the bit-plane value when the current block becomes significant.

17. A method according to claim 15 wherein the old significant coefficient value is refined according to $C_{ij}=\text{Sign}(C_{ij}) \cdot (|C_{ij}|-(-1)^{b_{\text{ref}}} \cdot 2^{k-1})$, where $b_{ref}$ is said encoded refinement bit.

18. A method according to claim 15 wherein the current block is new significant when the encoded input bit is "1", insignificant when the encoded input bit is "0" and old significant when the coefficient value is already significant on a previously decoded bit-plane.

19. A system, comprising:

a transform processor for transforming an image into a set of coefficients having bits on different bit-planes; and an embedded encoder receiving the coefficients and separately for each individual bit-plane starting from a most significant bit-plane to a lesser significant bit-plane identifying significant blocks of adjacent frequency coefficients in each bit-plane having one or more significant coefficients and insignificant blocks having only insignificant coefficients, the embedded encoder encoding each individual bit-plane separately and in order of significance by generating encoded values representing the insignificant blocks, decomposing the significant blocks into smaller blocks within the significant blocks until the decomposed blocks contain only insignificant coefficients or one coefficient, and generating encoded values representing the insignificant blocks and decomposed blocks in order starting from the most significant bit-plane to the lesser significant bit-plane.

20. A system according to claim 19 wherein the decomposed blocks are identified by the embedded encoder as significant blocks or insignificant blocks, the embedded encoder generating encoded values representing each insignificant decomposed block, decomposing the significant decomposed blocks into smaller decomposed blocks and generating encoded bit representing each one of the smaller decomposed blocks.

21. A system according to claim 19 including identifying the significant blocks as new significant blocks when an absolute value for at least one of the coefficients is between the value of the currently scanned bit-plane and a value of a last previously scanned bit-plane and identifying the significant blocks as old significant blocks when the absolute value is greater than the value of the last previously scanned bit-plane.

22. A system, comprising:

a transform for transforming an image into a set of coefficients having bits on different bit-planes;

an embedded encoder receiving the coefficients and identifying significant blocks in each bit-plane having one or more significant coefficients and insignificant blocks having only insignificant coefficients, the encoder encoding each bit-plane by generating encoded values representing the insignificant blocks, decomposing the significant blocks until the decomposed blocks contain only insignificant coefficients or one coefficient, and generating encoded values representing the insignificant blocks and decomposed blocks;

an embedded decoder that inputs the encoded values from the embedded encoder and generates a coefficient value according to a value of the current bit-plane and the encoded sign bit when the current block is new significant and comprises only a single coefficient;

inputs a refinement bit from the embedded encoder and refines the coefficient value according to a value of the current bit-plane and the refinement bit when the current block is old significant and comprises only a single coefficient; and decomposes the current block into smaller blocks, redefines the smaller blocks one by one as the current block, generates new coefficient values when the smaller blocks are identified as a new significant coefficient and refines existing coefficient values when the smaller blocks are identified as an old significant coefficient.

23. A quad-tree embedded coding method, comprising:

deriving a two-dimensional array of image coefficients having values extending over multiple bit-planes;

segmenting the two-dimensional array of image coefficients for each one of the multiple bit-planes into blocks;

for each individual bit-plane and in order of significance identifying blocks having only insignificant coefficients and outputting encoded values representing the identified blocks;

for each individual bit-plane in order of significance decomposing the blocks having one or more significant coefficients into smaller quadrants within the blocks;

repeatedly identifying the smaller quadrants within the blocks having only insignificant bits and outputting encoded values representing the identified smaller quadrants for each individual bit-plane in order of bit-plane significance;

for each individual bit-plane repeatedly decomposing the smaller quadrants having one or more significant coefficients into smaller quadrants within the blocks until the quadrants contain only single coefficients and then outputting encoded values for the single coefficients; and repeating the segmenting, encoding and decomposing of quadrants in each progressively lesser significant bit-plane until reaching a predetermined number of encoded bits.

24. A method according to claim 23 including:

identifying the significant blocks as new significant blocks when an absolute value for at least one of the coefficients is between the value of the currently scanned bit-plane and a value of a last previously scanned bit-plane; and identifying the significant blocks as old significant blocks when the absolute value is greater than the value of the last previously scanned bit-plane.

25. A method for decoding coefficients in a data array having values extending over multiple bit-planes, comprising:

initializing root blocks as zeros;

decoding a maximum significant bit-plane or implicitly inferring it from the transform;

scanning root blocks from the most significant bit-plane to the least significant bit-plane;

setting a current block to one root block in a current bit-plane value;

identifying the current block as new significant, old significant or insignificant;

deriving a coefficient value for the current block according to a current bit-plane value and an encoded sign bit when an encoded input bit indicates the current block is new significant and contains only one coefficient;

inputting an encoded refinement bit and refining the coefficient value for the current block according to the current bit-plane value and the refinement bit when the current block is old significant and contains only one coefficient; and decomposing the current block into sub-blocks and sequentially redefining the sub-blocks as the current block when the current block is significant and contains more than one coefficient.

* * * * *